（12） United States Patent
Cheng et al.

(10) Patent No.: US 10,003,452 B2
(45) Date of Patent: Jun. 19, 2018

(54) METHOD AND APPARATUS FOR OPERATION WITH CARRIER AGGREGATION OF TIME DIVISION DUPLEX CELLS

(71) Applicant: Telefonaktiebolaget L M Ericsson (publ), Stockholm (SE)

(72) Inventors: Jung-Fu Cheng, Fremont, CA (US); Mattias Frenne, Uppsala (SE); Johan Furuskog, Stockholm (SE); Daniel Larsson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 888 days.

(21) Appl. No.: 13/949,958

(22) Filed: Jul. 24, 2013

(65) Prior Publication Data

US 2014/0133369 A1 May 15, 2014

Related U.S. Application Data

(60) Provisional application No. 61/724,734, filed on Nov. 9, 2012.

(51) Int. Cl.
*H04J 3/00* (2006.01)
*H04L 5/16* (2006.01)
*H04L 5/00* (2006.01)

(52) U.S. Cl.
CPC .............. *H04L 5/16* (2013.01); *H04L 5/001* (2013.01); *H04L 5/0073* (2013.01)

(58) Field of Classification Search
None
See application file for complete search history.

(56) References Cited

U.S. PATENT DOCUMENTS

2012/0281601 A1* 11/2012 Kuo ................. H04W 72/042
370/280
2012/0327821 A1* 12/2012 Lin ................. H04W 72/048
370/280

(Continued)

FOREIGN PATENT DOCUMENTS

JP 2015537449 A 12/2015
WO 2014067140 A1 5/2014

OTHER PUBLICATIONS

3rd Generation Partnership Project. 3GPP TS 36.423 V11.1.0 (Jun. 2012). 3rd Generation Partnership Project; Technical Specification Group Radio Access Network; Evolved Universal Terrestrial Radio Access Network (E-UTRAN); X2 application protocol (X2AP) (Release 11). Jun. 2012, pp. 1-134.

(Continued)

*Primary Examiner* — Chirag Shah
*Assistant Examiner* — Jael Ulysse
(74) *Attorney, Agent, or Firm* — Murphy, Bilak & Homiller, PLLC

(57) ABSTRACT

According to the network-side teachings herein, transmission adaptations taken with respect to a secondary serving cell provide improved operation in the context of serving a half-duplex wireless device having a carrier aggregation configuration involving primary and secondary cells with different Time Division Duplex (TDD) uplink/downlink configurations. Transmission adaptations are taken with respect to a normal downlink subframe in a secondary cell that is time-wise overlapped by a special subframe in the primary cell. Similarly, improved operations are obtained on the device-side according to reception adaptations taken with respect to normal downlink subframes in a secondary cell that are overlapped by special subframes in the primary cell. Non-limiting improvements include better channel estimation and link adaptation, improved scheduling, and (Continued)

revised timings for the transmission and reception of user or control data targeting the device.

11 Claims, 15 Drawing Sheets

(56) References Cited

U.S. PATENT DOCUMENTS

| | | | | |
|---|---|---|---|---|
| 2013/0083706 | A1* | 4/2013 | Lin | H04L 5/14 370/280 |
| 2013/0155898 | A1* | 6/2013 | Yin | H04L 1/0026 370/254 |
| 2013/0242729 | A1* | 9/2013 | Chen | H04W 28/0289 370/230 |
| 2013/0301434 | A1* | 11/2013 | Krishnamurthy | H04L 1/0026 370/252 |
| 2013/0308550 | A1* | 11/2013 | Yin | H04L 5/001 370/329 |
| 2013/0336160 | A1* | 12/2013 | Yin | H04L 1/1854 370/254 |
| 2014/0112243 | A1* | 4/2014 | Suzuki | H04W 56/00 370/328 |

OTHER PUBLICATIONS

3rd Generation Partnership Project. "Half duplex operation for TDD inter-band CA with different UL-DL configurations." 3GPP TSG RAN WG1 Meeting #71, R1-124685, Nov. 12-16, 2012, pp. 1-4, New Orleans, USA.

3rd Generation Partnership Project. "Half duplex operation with inter-band CA with different TDD configurations on different bands." 3GPP TSG-RAN WG1 Meeting #71, R1-124997, Nov. 12-16, 2012, pp. 1-4, New Orleans, USA.

Author Unknown, "Impact of Half-duplex TDD UE on MAC Layer," CATT; 3GPP TSG RAN WG2 Meeting #81; R2-130104; Jan. 28-Feb. 1, 2013. pp. 1-2. St. Julian's, Malta.

Nokia Siemens Networks et al, "Views on inter-band CA with different TDD configurations on different bands", 3GPP TSG-RAN WG2 Meeting #75, R2-113896, Nokia Siemens Networks, Nokia Corporation, Athens, Greece, Aug. 22-26, 2011, pp. 1-4.

* cited by examiner

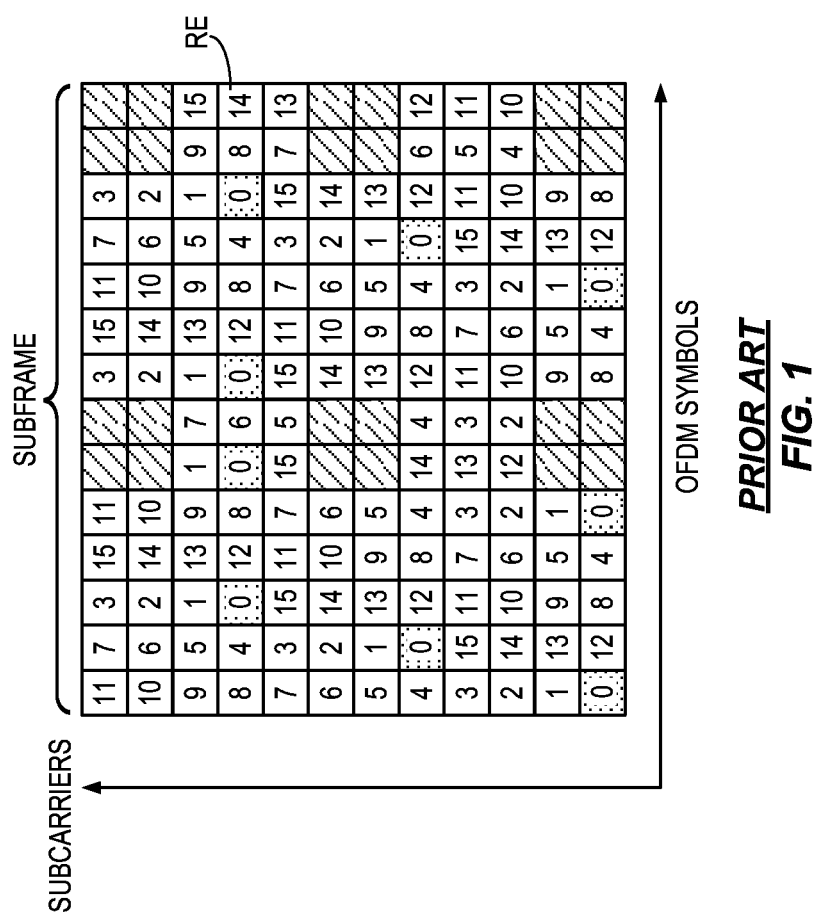
PRIOR ART
FIG. 1

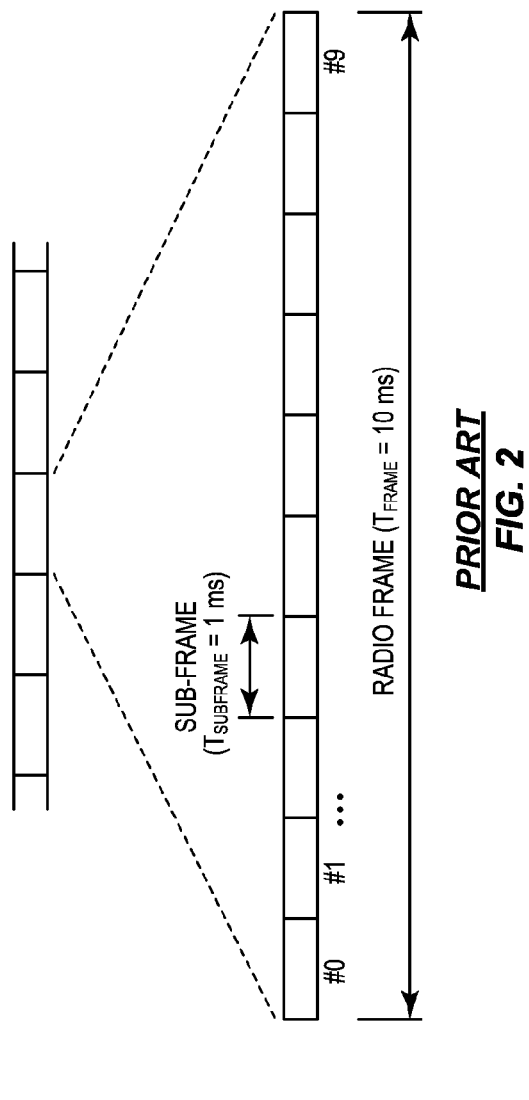
*PRIOR ART*
*FIG. 2*
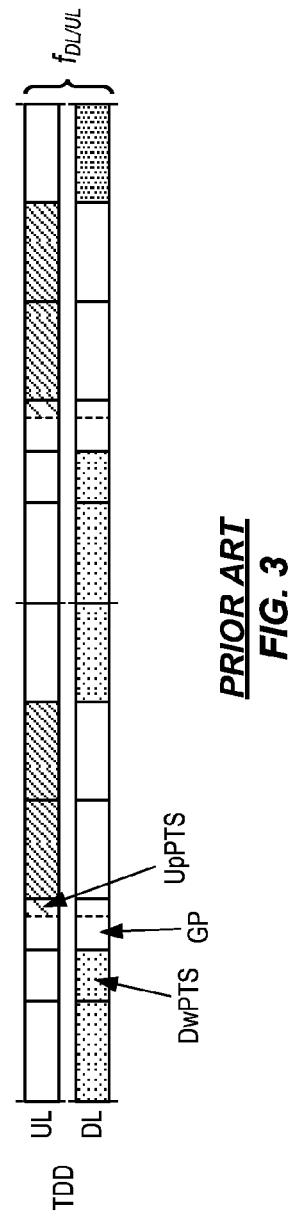
*PRIOR ART*
*FIG. 3*

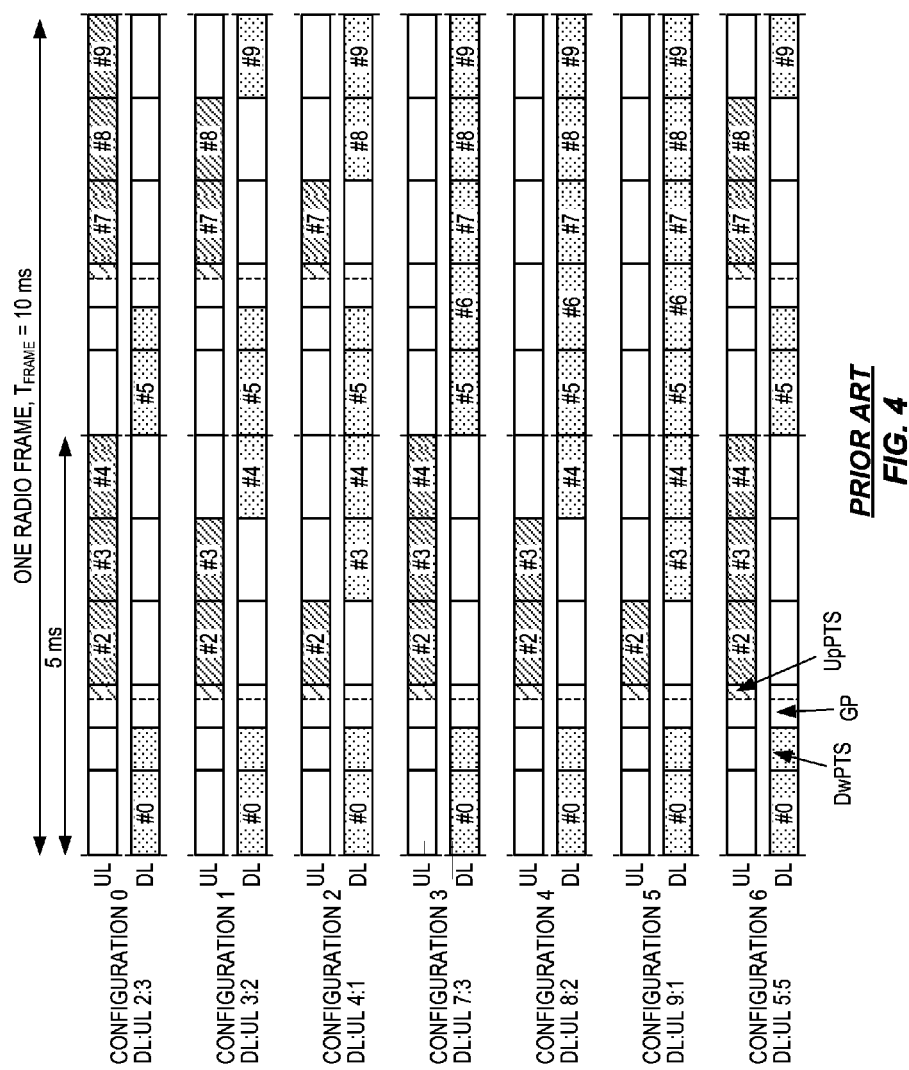
PRIOR ART
FIG. 4

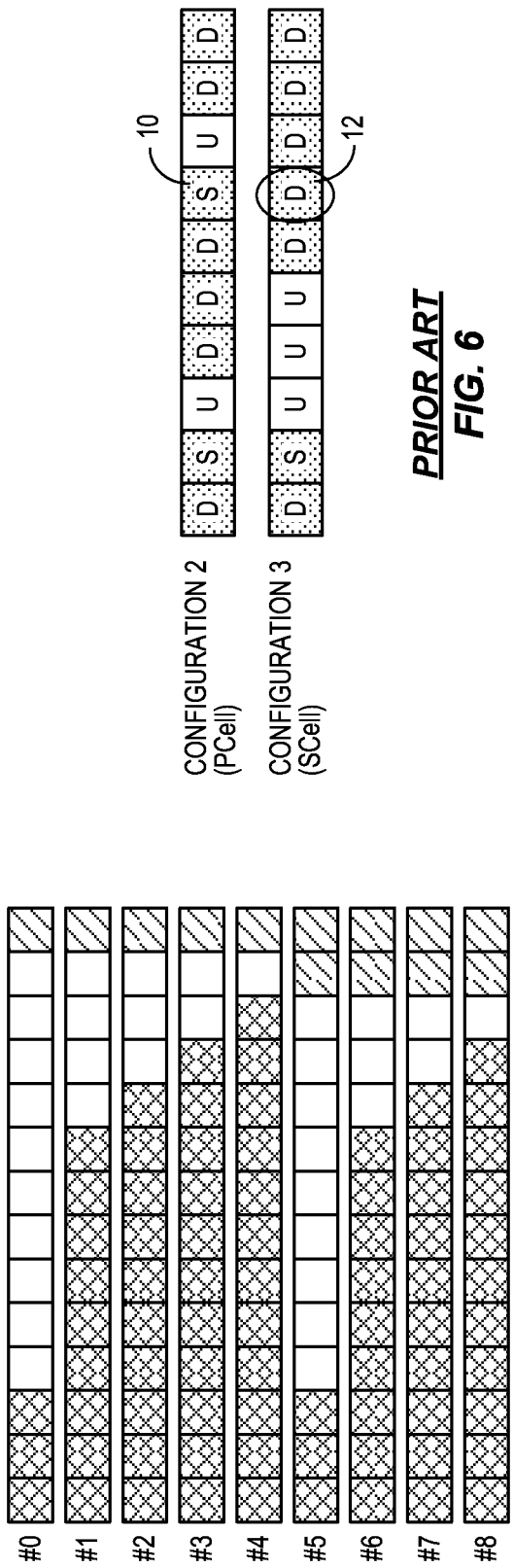
PRIOR ART
FIG. 6
PRIOR ART
FIG. 5

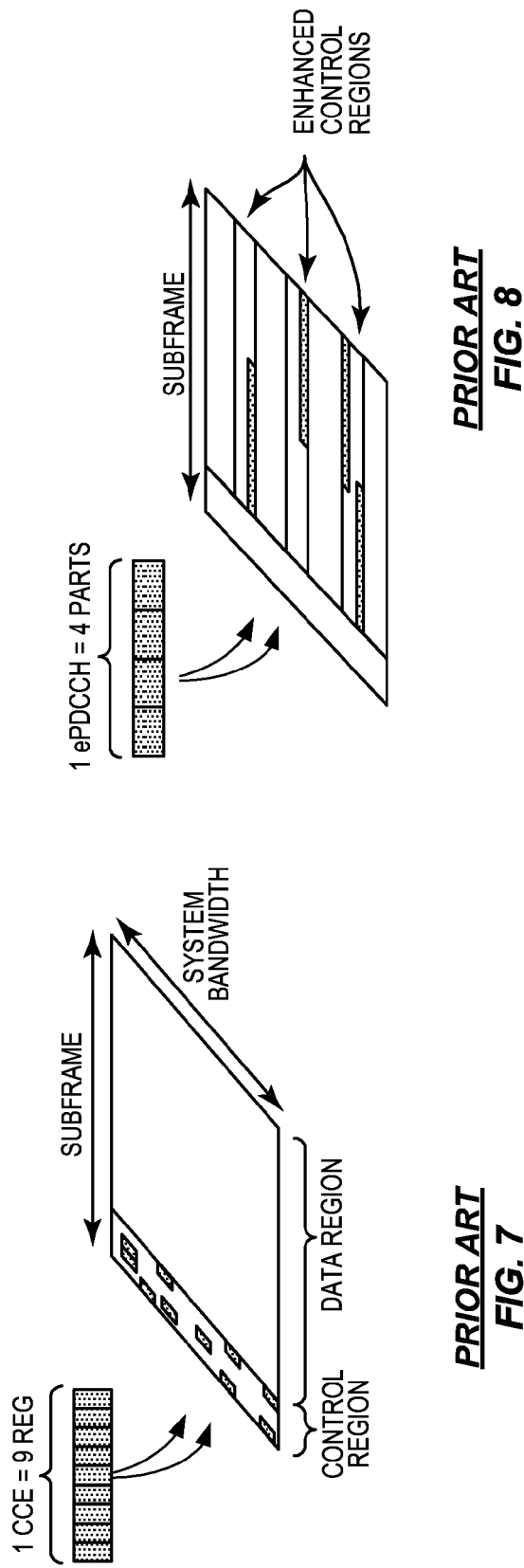

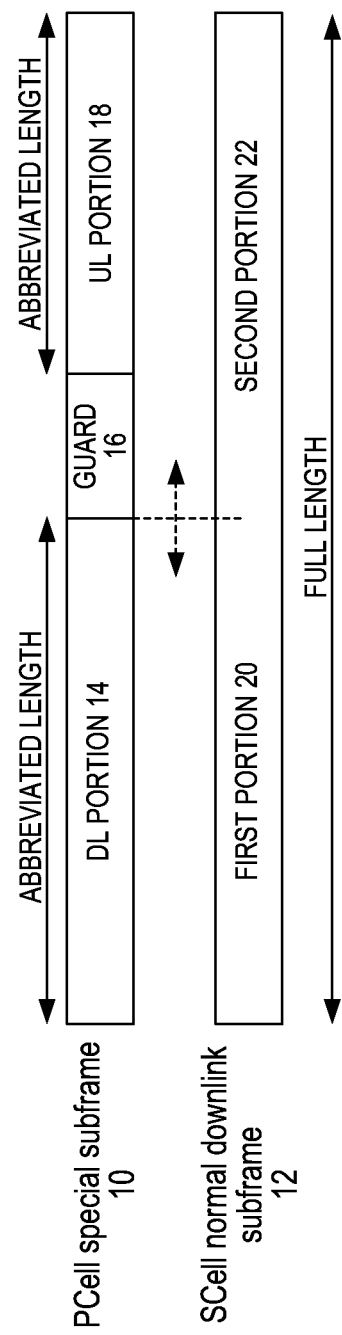
FIG. 9

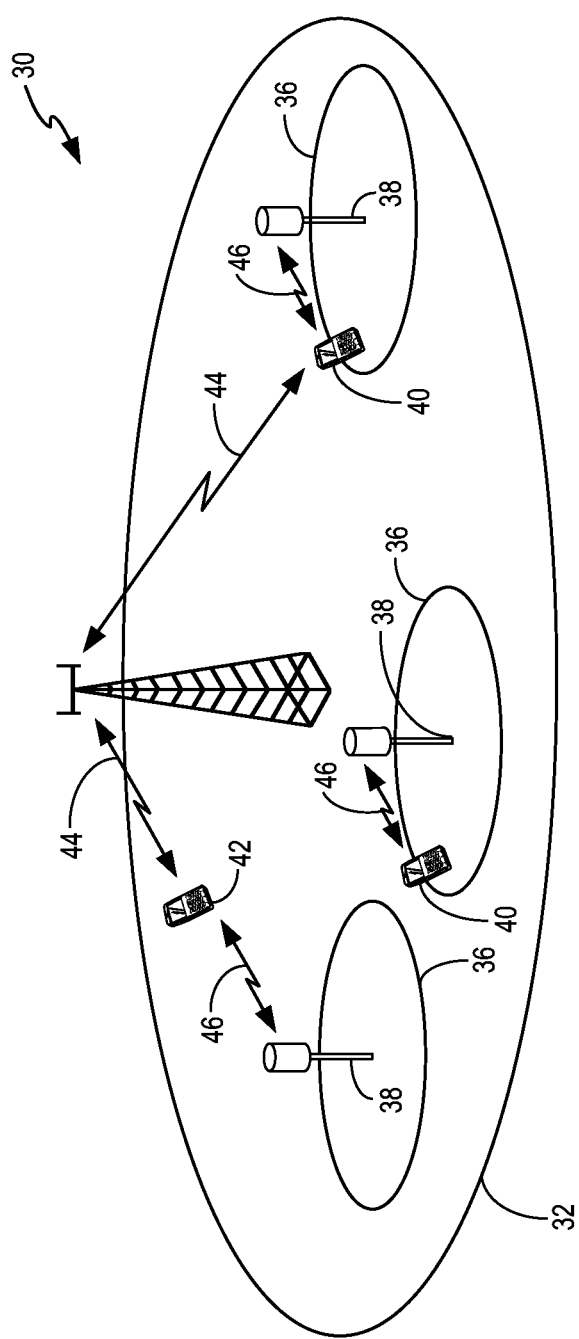
FIG. 10

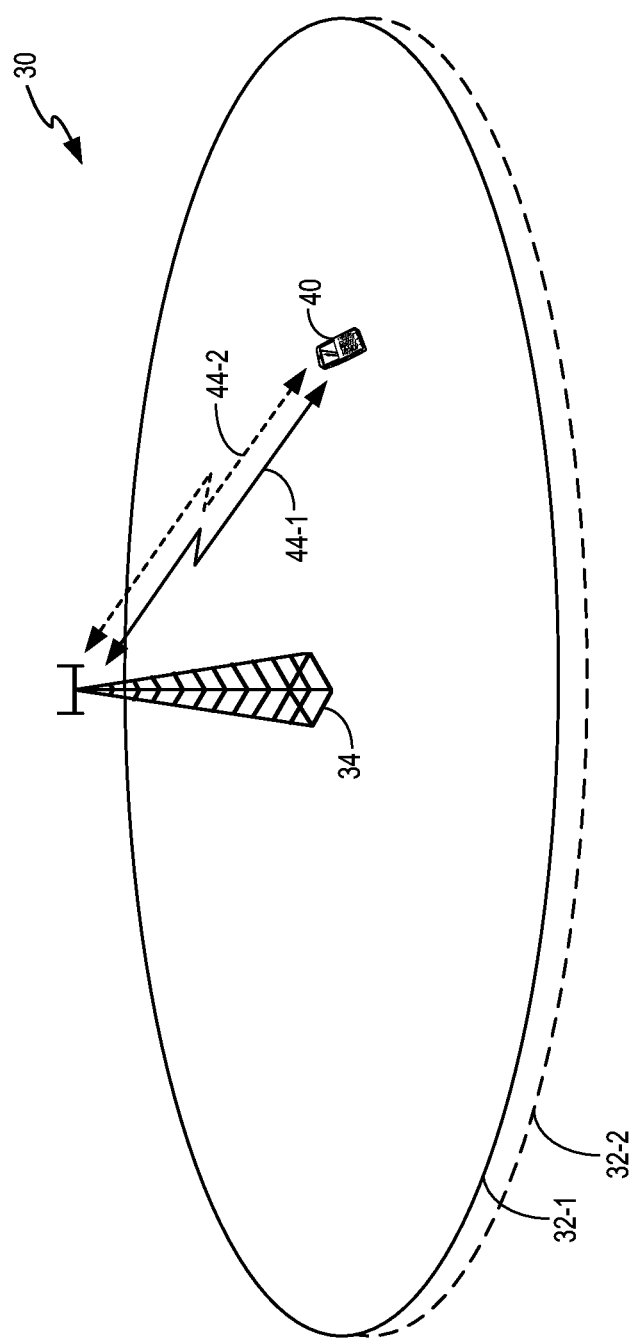
FIG. 11

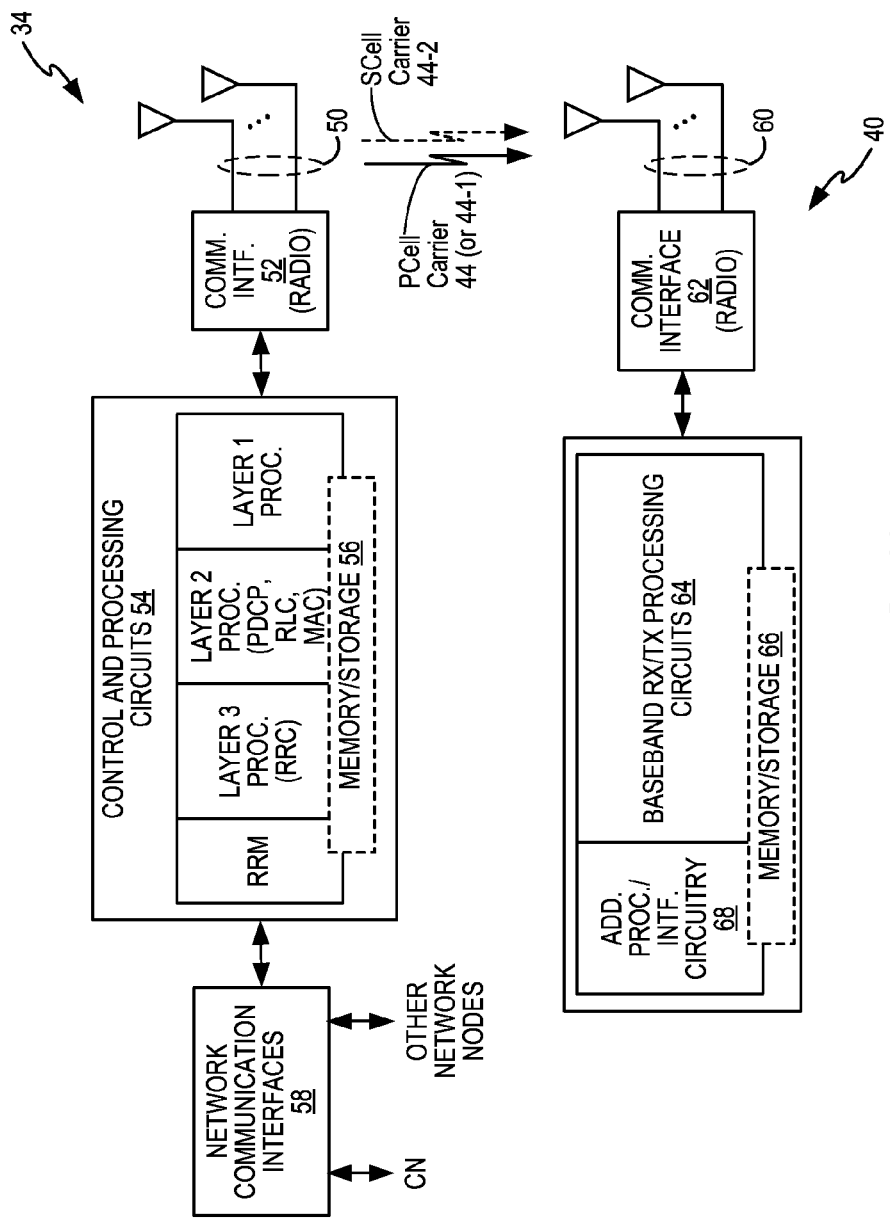
FIG. 12

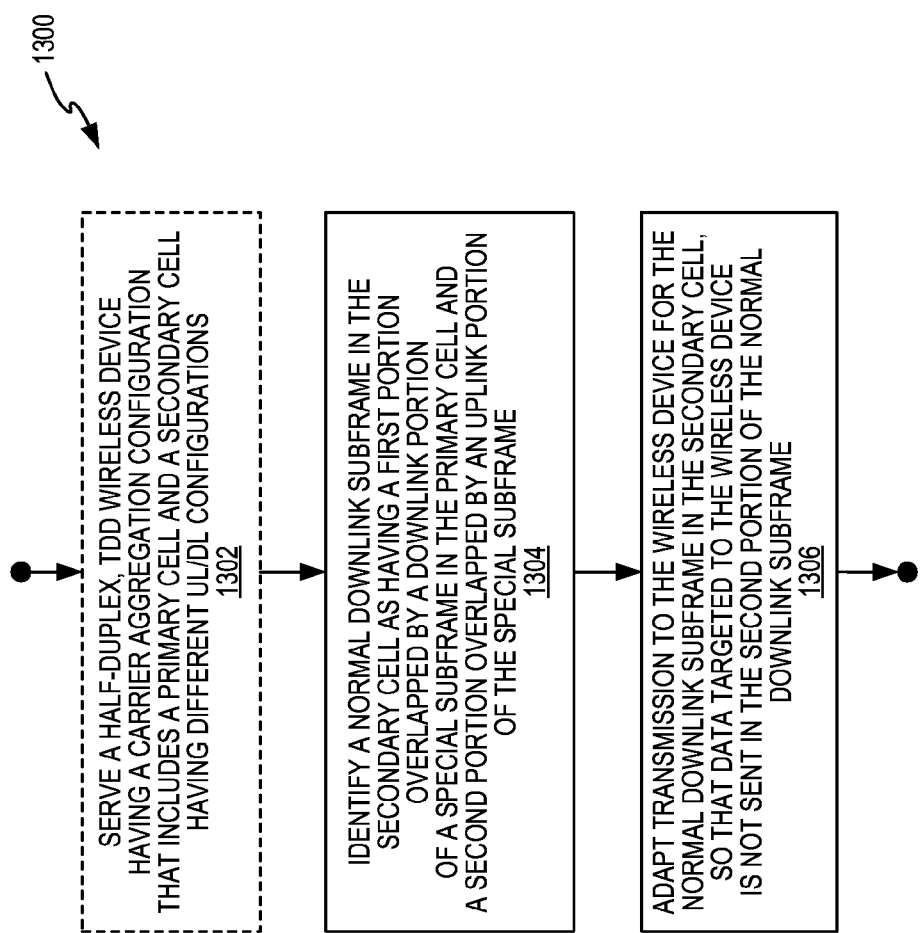
FIG. 13

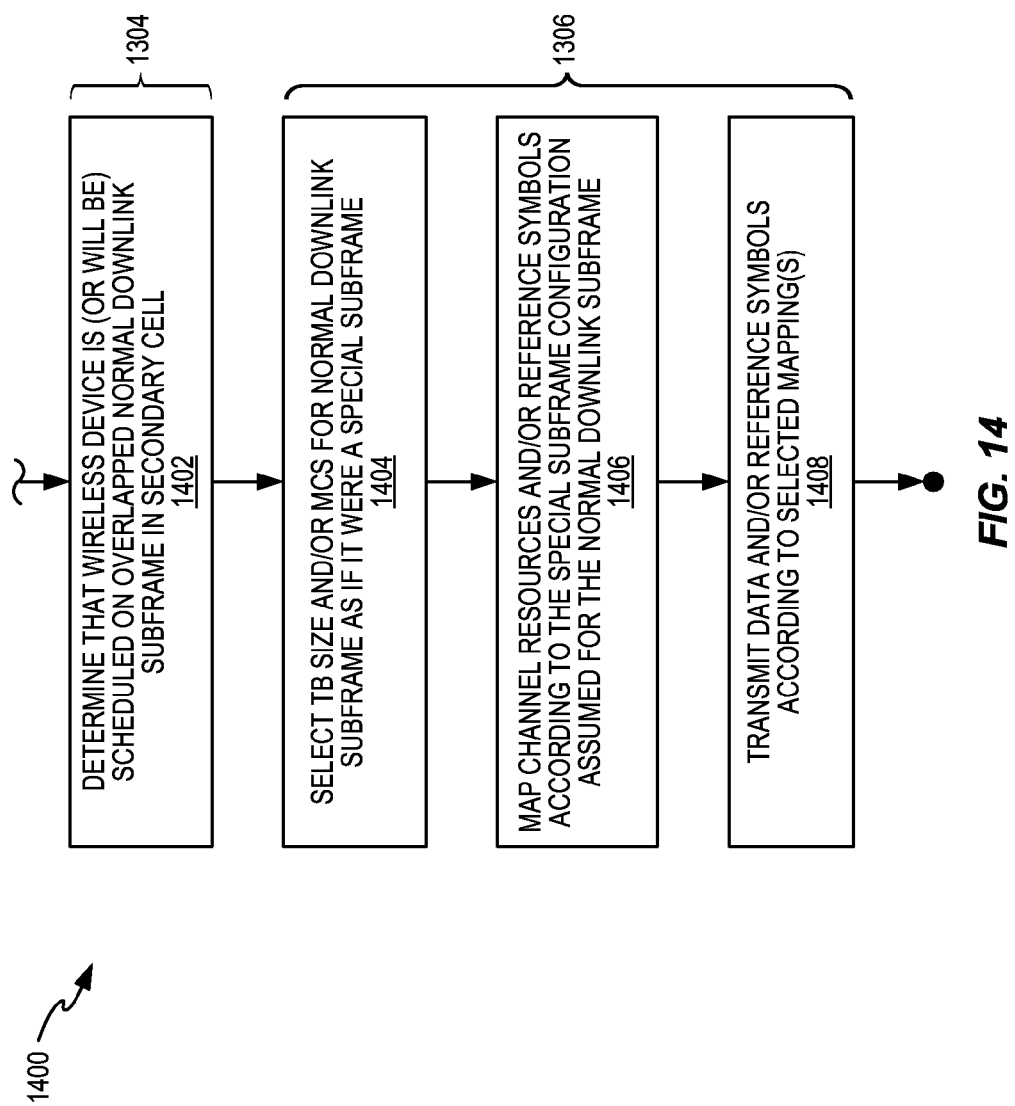
FIG. 14

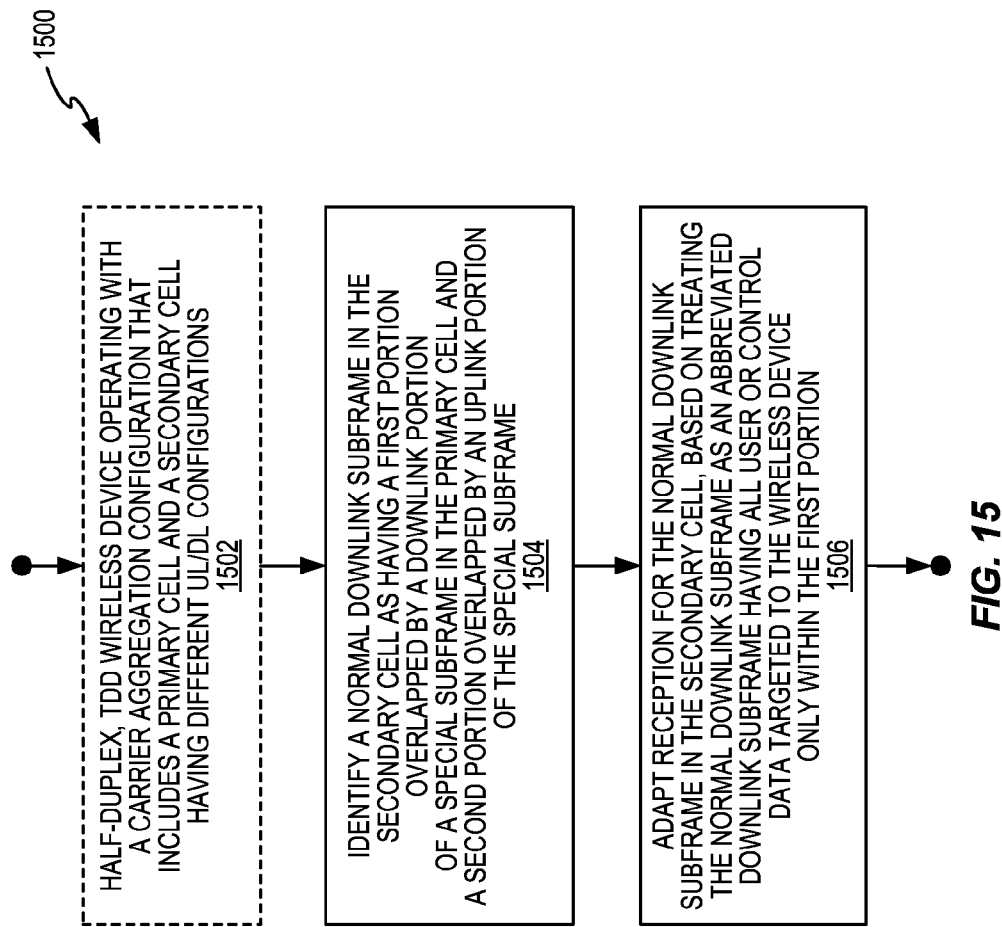
FIG. 15

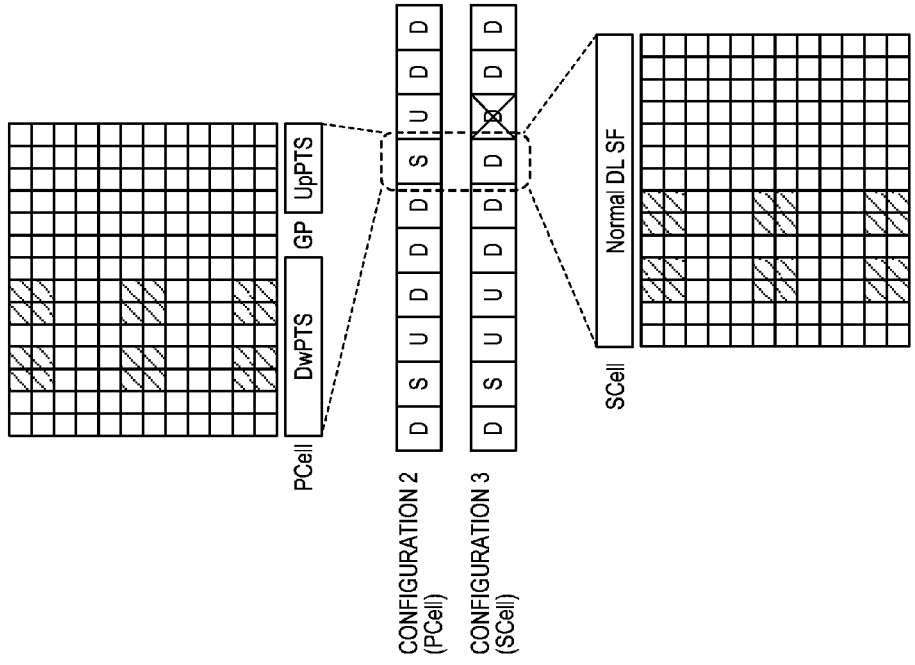

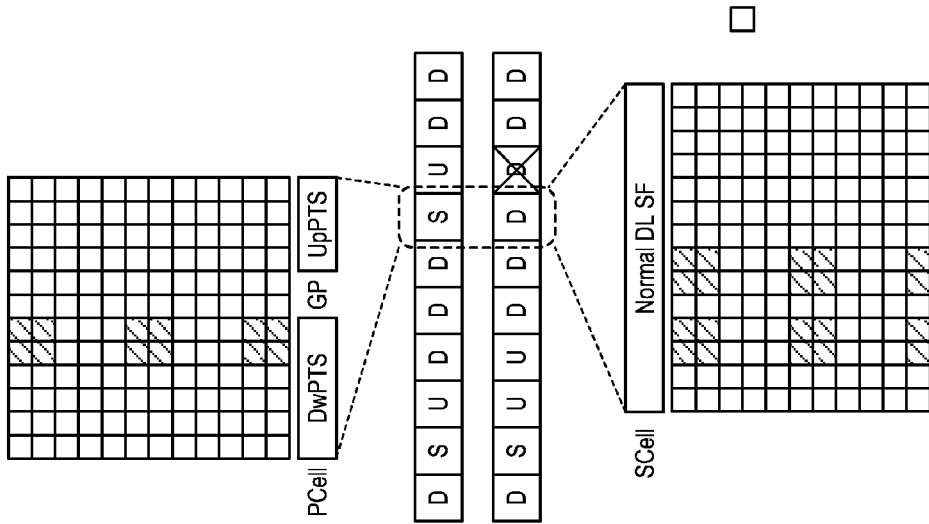
FIG. 18
| PCell with normal cyclic prefix | Stop PDSCH / EPDCCH transmission after X OFDM symbols on the SCell with normal cyclic prefix |
|---|---|
| 0, 4 | X = 3 |
| 1, 5 | X = 9 |
| 2, 6 | X = 10 |
| 3 | X = 11 |
| 7 | X = 5 |
FIG. 16D

| PCell configuration | DM-RS position type on SCell |
|---|---|
| Normal CP, special subframe configuration 1, 2, 3, 4, 6, 7, 8 | Extended CP, special subframe configuration 1, 2, 3, 5, 6 |
| Extended CP, special subframe configuration 3 | Normal CP, special subframe configuration 3, 4, 8 |
| Extended CP, special subframe configuration 1, 2, 5, 6 | Normal CP, special subframe configuration 1, 2, 6, 7 |

FIG. 19

METHOD AND APPARATUS FOR OPERATION WITH CARRIER AGGREGATION OF TIME DIVISION DUPLEX CELLS

RELATED APPLICATIONS

This application claims priority under 35 U.S.C. § 119(e) from the U.S. provisional patent application identified by Application Ser. No. 61/724,734, which was filed on 9 Nov. 2012 and is incorporated herein by reference.

TECHNICAL FIELD

The present invention generally relates to wireless communication networks, and particularly relates to operation in such networks with respect to carrier aggregation of Time Division Duplex (TDD) cells.

BACKGROUND

Long Term Evolution (LTE) networks use Orthogonal Frequency Division Multiplexing (OFDM) in the downlink (DL) and Discrete Fourier Transform (DFT) spread OFDM in the uplink (UL). The basic LTE downlink physical resource can thus be seen as a time-frequency grid as illustrated in FIG. 1, where each resource element corresponds to one OFDM subcarrier during one OFDM symbol interval. Within the grid illustration, then, each column represents one OFDM symbol interval, each row represents one subcarrier of a defined subcarrier frequency, and each cell in the grid represents a given resource element or RE.

In the time domain, LTE downlink transmissions are organized into radio frames of 10 ms, each radio frame consisting of ten equally-sized subframes of length Tsubframe=1 ms. FIG. 2 illustrates the frame/subframe structure. Transmission and reception from a given node, e.g. a terminal in a cellular system such as LTE, can be multiplexed in the frequency domain or in the time domain (or combinations thereof). Frequency Division Duplex (FDD) implies that downlink and uplink transmission take place in different, sufficiently separated, frequency bands. Time Division Duplex (TDD) implies that downlink and uplink transmission take place in different, non-overlapping time slots.

TDD operation thus allows a single carrier frequency and uplink and downlink transmissions are separated in time. Because the same carrier frequency is used for uplink and downlink transmission in TDD, both the base station and the mobile terminals need to switch from transmission to reception and vice versa. An essential aspect of any TDD system is to provide the possibility for a sufficiently large guard time where neither downlink or uplink transmissions occur. This is required to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). FIG. 3 illustrates the special subframe structure.

According to that structure, a special subframe can be understood as being both an uplink and a downlink subframe, in that it has a portion used for the downlink and a portion used for the uplink. Regular or normal subframes, i.e., the subframes that are not "special" according to the foregoing definition, are either allocated to uplink or downlink transmission.

TDD allows for different asymmetries in terms of the amount of resources allocated for uplink and downlink transmission, respectively, by means of different downlink/uplink configurations. That is, different cells within an LTE or other type of cellular communication network may use different Uplink/Downlink (UL/DL) configurations, meaning that different cells have different allocations of uplink subframes and downlink subframes.

In the LTE example, there are seven different configurations ("Configuration 0" through "Configuration 6") as shown in FIG. 4. Further, there are nine different configurations for special subframes ("Configuration 0" through "Configuration 8"), as shown in FIG. 5. In FIG. 5, cross-hatched blocks represent DL OFDM symbols, diagonally-hatched blocks represent UL OFDM symbols, and empty blocks represent guard time.

Turning to another concept momentarily, the communication specifications referred to as "Release 8," as promulgated by the Third Generation Partnership Project (3GPP), supported bandwidths up to 20 MHz. To meet the IMT-Advanced requirements, however, Release 10 supported larger bandwidths. For compatibility, a Release 10 LTE carrier wider than 20 MHz appears to a Release 8 wireless device or terminal as more than one LTE carrier, with each such carrier referred to as a "component carrier" having a bandwidth of 20 MHz or less. For efficiency, Release 10 made it possible to have a wideband carrier that allowed for legacy Release 8 terminals to be scheduled within all parts of the wideband carrier. Carrier Aggregation or "CA" provides for such efficiency.

Carrier Aggregation implies that an LTE Release 10 (Rel-10) terminal can receive multiple component carriers, where the component carriers have, or at least the possibility to have, the same structure as a Rel-8 carrier. As a general proposition, interference in the network is reduced or at least more easily managed when the neighboring cells associated with an aggregated set of component carriers all use the same UL/DL configuration—i.e., the same allocations of uplink and downlink subframes within a frame.

CA as implemented in Rel-10 was based on having the same UL/DL configuration among all cells configured as serving cells in a CA configuration. Rel-11 changes that, however, and allows the aggregation of component carriers having different UL/DL configurations. The change provides more flexible aggregation scenarios, such as aggregating carriers within a heterogeneous network that provides radio coverage over a certain geographic area using a mix of high-power base stations and low-power base stations or access points.

The ability to aggregate carriers having different UL/DL configurations also provides more flexibility in adapting to changing traffic patterns—i.e., to change the uplink-to-downlink subframe allocations within a given cell or cells of the network, to reflect the actual traffic patterns of terminals operating within those cells.

With the introduction of different UL/DL configurations on different carriers, two types of TDD terminals must be considered. A first type is referred to as being full duplex, meaning that it can simultaneously transmit on one carrier while receiving on another carrier. A second type of TDD terminal is referred to a being half duplex, because it cannot transmit and receive at the same time.

It is recognized herein that a number of complex challenges arise in the context of a half-duplex TDD terminal that has CA serving cells with differing UL/DL configurations. FIG. 6 illustrates one aspect of the challenges. Consider a CA configuration involving a Primary Cell (PCell) having one UL/DL configuration and a Secondary Cell (SCell) having a different UL/DL configuration. Because the two cells use different UL/DL configurations, special subframes in the PCell, which the terminal is obligated to process, may coincide with normal downlink subframes in the SCell. FIG. 6 illustrates a special subframe 10 in the PCell coinciding or overlapping with a normal downlink subframe 12 in the SCell. "Coinciding" in this sense means at least partly overlapping in time—e.g., assuming synchronized frame timing between the primary and secondary cells, the normal downlink subframe 12 in the secondary cell is transmitted at the same time as the special subframe in the primary cell.

FIGS. 7 and 8 illustrate the logical structure of an LTE subframe with respect to certain control channels. FIG. 7 in particular shows a control region that comprises the first four OFDM symbols of the subframe. Physical Downlink Control Channel (PDCCH) transmissions occur within this control region. The OFDM time-frequency grid within the control channel region offers a resource element or RE, which represents the time-frequency intersection of one subcarrier within one OFDM symbol time. Resource Element Groups or REGs are built up from four REs, and Control Channel Elements or CCEs aggregate nine REGs. In turn, a PDCCH aggregates a number of CCEs, with the number of CCEs aggregated for a given PDCCH being referred to as its CCE aggregation level. PDCCHs are used to transmit Downlink Control Information (DCI) to targeted terminals.

In contrast, FIG. 8 illustrates that the enhanced PDCCH (ePDCCH) is transmitted across the latter portion of the subframe in so called enhanced control regions. Consequently, a terminal is not expected to receive ePDCCH in a special subframe with special subframe configuration 0 or 5, where a normal Cyclic Prefix (CP) is used. Nor is the terminal expected to receive the ePDCCH in a special subframe having configuration 0, 4, or 7 in extended CP. Similarly, while the Physical Downlink Shared Channel (PDSCH) is not illustrated, it extends over the data portion of a subframe and a terminal targeted by the transmission is not expected to receive the PDSCH in a special subframe with special subframe configuration 0 or 5 in normal CP, or in a special subframe configuration 0 or 4 in extended CP. Still further, the abbreviation of the downlink portion within special subframes also means that a terminal is not expected to receive Demodulation Reference Symbol (DMRS) transmissions in a special subframe.

SUMMARY

According to the network-side teachings herein, transmission adaptations taken with respect to a secondary serving cell provide improved operation in the context of serving a half-duplex wireless device having a carrier aggregation configuration involving primary and secondary cells with different Time Division Duplex (TDD) uplink/downlink configurations. Transmission adaptations are taken with respect to a normal downlink subframe in a secondary cell that is time-wise overlapped by a special subframe in the primary cell. Similarly, improved operations are obtained on the device-side according to reception adaptations taken with respect to normal downlink subframes in a secondary cell that are overlapped by special subframes in the primary cell. Non-limiting improvements include better channel estimation and link adaptation, improved scheduling, and revised timings for the transmission and reception of user or control data targeting the device.

According to an example, a network node performs a method that includes serving a half-duplex, Time Division Duplex (TDD) wireless device having a carrier aggregation configuration that includes a primary cell and a secondary cell having different UL/DL configurations. The network node may be a base station, for example, that provides one or more of the cells implicated in the carrier aggregation configuration.

The method further includes identifying a normal downlink subframe in the secondary cell as having a first portion overlapped by a downlink portion of a special subframe in the primary cell and a second portion overlapped by an uplink portion of the special subframe. For example, the identifying operation involves the base station or other network node recognizing which normal downlink subframes in one or more secondary cells coincide time-wise with special subframes in the primary cell.

The method further includes adapting transmission to the wireless device for the normal downlink subframe in the secondary cell, so that data targeted to the wireless device is not sent in the second portion of the normal downlink subframe. In a non-limiting example, the wireless communication network is a Long Term Evolution (LTE) network, and the special subframe and the normal downlink subframe are transmission subframes on primary and secondary LTE carriers in the primary and secondary cells, respectively.

In another example, a half-duplex wireless device is configured to perform a method in the context of operating in a CA configuration that includes primary and secondary cells having different UL/DL configurations. In this context, the method includes identifying a normal downlink subframe in the secondary cell as having a first portion overlapped by a downlink portion of a special subframe in the primary cell and a second portion overlapped by an uplink portion of the special subframe.

The method further includes adapting reception for the normal downlink subframe in the secondary cell, based on treating the normal downlink subframe as an abbreviated downlink subframe having all user or control data targeted to the wireless device only within the first portion. In an example of "treating" the normal downlink subframe as an abbreviated downlink subframe, the wireless device assumes that all control or user data targeted to it in the normal downlink subframe will be sent only in the first portion of the downlink subframe. As a consequence, the receiver processing operations in this example adaptation treat reception in the normal downlink subframe as being completed within the first downlink portion and exclude the second portion from consideration in downlink reception processing for the normal downlink subframe.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of a known, example subframe structure that is based on Orthogonal Frequency Division Multiplex (OFDM) resource elements (REs.)

FIG. 2 is a diagram of a known, example radio frame and subframe timing.

FIG. 3 is a diagram of a known, example Time Division Duplex (TDD) transmission scheme for downlink and uplink transmissions in a Long Term Evolution (LTE) network.

FIG. 4 is a diagram of known, example TDD configurations that may be used within given cells of an LTE-based wireless communication network.

FIG. 5 is a diagram of known, example configurations for "special subframes" that may be used from time to time in a TDD-based cell, where a special subframe is not a normal downlink subframe or a normal uplink subframe, and instead includes both a downlink portion and an uplink portion.

FIG. 6 is a diagram illustrating an example case in the context of carrier aggregation, where a special subframe in a primary cell (PCell) overlaps a normal downlink subframe in an aggregated secondary cell (SCell).

FIGS. 7 and 8 are diagrams of known, example subframe configurations for a Physical Downlink Control Channel (PDCCH) and for an enhanced PDCCH (ePDCCH), as used in LTE networks.

FIG. 9 is a diagram illustrating an advantageous logical partitioning or treatment of a normal downlink subframe in a SCell that is overlapped by a special subframe in an aggregated PCell.

FIG. 10 is a block diagram of one embodiment of a wireless communication network that supports carrier aggregation and includes one or more network nodes adapted according to the teachings herein.

FIG. 11 is a block diagram of another embodiment of a wireless communication network that supports carrier aggregation and includes one or more network nodes adapted according to the teachings herein.

FIG. 12 is a block diagram of an example embodiment for a base station as one example of the network node contemplated herein, and further provides an example block diagram of a contemplated wireless device, which may be a Third Generation Partnership Project (3GPP) User Equipment (UE) or other such terminal.

FIG. 13 is a logic flow diagram of one embodiment of a method of processing at a network node according to the teachings herein.

FIG. 14 is a logic flow diagram of example details for selected portions of the method introduced in FIG. 13.

FIG. 15 is a logic flow diagram of one embodiment of a method of processing at a wireless device according to the teachings herein.

FIGS. 16A-16D are tables illustrating example configuration or control values used in various transmission and/or reception adaptations, as taught herein.

FIG. 17 is a diagram illustrating one example of reference symbol remapping, for transmission and/or reception adaptions as taught herein.

FIG. 18 is a diagram illustrating another example of reference symbol remapping, for transmission and/or reception adaptions as taught herein FIG. 19 is a table illustrating examples of reference symbol remapping configurations, for transmission and/or reception adaptations as taught herein.

DETAILED DESCRIPTION

FIG. 9 illustrates an advantageous logical partitioning and/or treatment of a normal downlink subframe 12 in a secondary cell (SCell) that is overlapped by a special subframe 10 in a primary cell (PCell), where the PCell and the SCell are aggregated in a Carrier Aggregation (CA) sense with respect to a given mobile terminal or other wireless device. One sees that the special subframe 10 in the primary cell (PCell) includes a Downlink (DL) portion 14, a guard portion 16, and an Uplink (UL) portion 18.

Correspondingly, the normal downlink subframe 12 in the SCell is "logically" divided into or viewed as having a first portion 20 and a second portion 22. The first portion 20 is not overlapped by the UL portion 18 of the special subframe 10 in the primary cell 10. The second portion 22 is at least partially overlapped by the UL portion 18, and additionally may be overlapped by all or part of the guard portion 16. In this respect, it will be understood that allowing the first portion 20 of the normal downlink subframe 12 to time-wise extend into at least a portion of guard portion 16 of the special subframe 10 increases the amount of downlink time available in the SCell, with respect to the normal downlink subframe 12.

FIG. 10 illustrates an example wireless communication network 30 in which the overlapping subframes 10 and 12 of FIG. 9 may occur, and in which one or more network nodes and wireless devices are configured according to the teachings herein. The wireless communication network 30 in this illustrated working example comprises a "heterogeneous" network having a macro cell 32 provided by a macro base station 34. One or more micro cells 36 are provided by respective micro base stations 38. The micro cells 36 comprise, for example, wireless hotspots that provide enhanced data rate coverage for select areas within the macro cell 32 and/or provide localized areas of improved wireless coverage that fills in coverage gaps within the macro cell 32.

A wireless device 40 operating in the wireless communication network 30 thus may receive service from one or more macro cells 32 and/or one or more micro cells 36. In this regard, service within the macro cell 32 is provided via a carrier 44 for UL/DL signaling with respect to one or more of the wireless devices 40, while each micro cell 36 provides a carrier 46 for UL/DL signaling with respect to given wireless devices 40. Possible carrier aggregation contexts include an aggregation of two or more macro cells 32, a mix of macro and micro cells 32 and 36, or, possibly, two or more micro cells 36. As one example, the PCell may be a macro cell 32 with the SCell being a neighboring macro cell 32 or an overlaid micro cell 36.

There also may be a mix of device types operating in the network 30. For example, the wireless devices 40 may be half-duplex TDD devices, but there may also be one or more wireless devices 42 that are full-duplex TDD devices. A full-duplex TDD wireless device 42 can simultaneously receive on one carrier 44 or 46, while transmitting on another carrier 44 or 46. Also note that the different carriers at issue in CA may be in different radio frequency bands i.e., an inter-band aggregation.

FIG. 11, like FIG. 10 is another non-limiting example scenario in which a normal downlink subframe 12 in a SCell may be overlapped by a special subframe in the PCell. Here, however, the primary and secondary cells at issue are two macro cells 32-1 and 32-2, which may have the same or different sizes and which may have the same or different, but at least partially overlapping, macro coverage areas. In an example configuration, the base station 34 provides service in the cell 32-1 using the carrier 44-1 in one frequency band, and provides service in the cell 32-2 using the carrier 44-2 in another frequency band. The illustrated wireless device 40 has a CA configuration where one of the two cells 32-1, 32-2 represents the PCell and the other one of the two cells 32-1, 32-2 represents the SCell.

Thus, unless specificity is needed for clarity of discussion, references herein to CA scenarios may involve two or more macro cells 32/carriers 44, or two or more micro cells 36/carriers 46, or a mix of one or more macro cells 32/carriers 44 with one or more micro cells 36/carriers 46. Similarly, the term "wireless device 40" will be used to generically refer to a given wireless device 40 involved in a carrier aggregation scenario, regardless of whether the contemplated CA scenario involves an aggregation of macro cells 32, micro cells 36, or a mix thereof.

FIG. 12 illustrates an embodiment of a base station 34, and an embodiment of a wireless device 40, which may be a mobile terminal or other type of User Equipment (UE), for example. The micro base stations 38 introduced in FIG. 10 may have the same or at least a similar configuration as that shown for the example base station 34, although as noted they may operate with different Radio Access Technologies (RATs) and/or in different radio frequency bands.

The base station 34 in FIG. 12 includes one or more transmit/receive antennas 50 and an associated communication interface 52 (e.g., radio transceiver circuits adapted for sending signals to wireless devices 40 and receiving signals from wireless devices 40). The base station 34 further includes control and processing circuits 54. This circuitry is broadly referred to as "the processing circuit 54" but it will be understood by those of ordinary skill in the art that the processing circuit 54 may include one or more CPUs, microprocessors, FPGAs, DSPs, and/or other digital processing circuits that are configured either fixedly or programmatically to carry out the network-side processing taught herein.

In an example arrangement, the processing circuit 54 implements Layer 1 (Physical Layer) processing, Layer 2 processing, including Packet Data Convergence Protocol (PDCP) processing, Radio Link Control (RLC) protocol processing, Medium Access Control (MAC) protocol processing, and further implements Layer 3 processing, e.g., Radio Resource Control or RRC processing, along with Radio Resource Management (RRM) functions, etc. The processing circuit 54 includes or is associated with memory/storage 56 which may comprise more than one memory or storage device or circuit, such as working memory in the form of DRAM or SRAM and non-volatile memory in the form of FLASH, EEPROM, or disk storage.

The example base station 34 also includes one or more network communication interfaces 58 that communicatively link the base station 34 to other base stations 34, 38 and/or with one or more Core Network (CN) nodes. In an example embodiment, the wireless communication network 30 comprises a Long Term Evolution or LTE network, and the network communication interfaces 58 include an "X2" interface to communicate with neighboring base stations 34, 38, and include an S1-MME interface to one or more Mobility Management Entities or MMEs within the CN and an S1-U interface to one or more Serving Gateways or S-GWs within the CN.

The example wireless device 40 also includes one or more transmit/receive antennas 60 and an associated communication interface 62, e.g., a cellular radio transceiver configured to receive downlink signals from the wireless communication network 30 and to transmit uplink signals to the wireless communication network 30. The wireless device 40 further includes one or more processing circuits 64, e.g., baseband receive/transmit (RX/TX) processing circuits, associated memory/storage 66, and, depending on particular configuration and intended usage, additional processing/interface circuitry 68 (e.g., a user interface and/or one or more application-level processors).

The baseband RX/TX processing circuits 64 are broadly referred to as "the processing circuit 64," but it should be understood that the processing circuit 64 may comprise one or more CPUs, microprocessors, FPGAs, DSPs, or one or more other digital processing circuits that are fixedly or programmatically configured to carry out device-side processing as taught herein. Regardless of these details, for purposes of this discussion, the example wireless device 40 is a half-duplex TDD terminal that supports CA, e.g., inter-band CA. It may be that the wireless device 40 is only capable of half-duplex TDD operation, or that it supports both half-duplex and full-duplex TDD operation in the CA context, but is configured for half-duplex, TDD operation.

Using base station 34 as an example, it is configured for use in a wireless communication network 30 and comprises a communication interface 52 that is configured for sending data to and receiving data from wireless devices 40 operating in one or more cells 32, 36 of the wireless communication network 30. The base station further includes a processing circuit 54 that is operatively associated with the communication interface 52 and is configured to perform transmission adaptation as taught herein, with respect to a half-duplex wireless device 40 being served in a carrier aggregation configuration that includes a PCell and SCell having different UL/DL configurations.

In implementing that functionality, the processing circuit 54 is configured to: identify a normal downlink subframe 12 in an SCell as having a first portion 20 overlapped by a downlink portion 14 of a special subframe 10 in the PCell and a second portion 22 overlapped by an uplink portion 18 of the special subframe 10; and adapt transmission to the wireless device 40 for the normal downlink subframe 12, so that data targeted to the wireless device 40 is not sent in the second portion 22 of the normal downlink subframe 12.

The wireless communication network 30 comprises a LTE network, for example, and the base station 34 is configured as an eNB that is associated with the PCell or the SCell, or both. In this example, the normal and special downlink subframes 10, 12 comprise transmission subframes on primary and secondary carriers 44 and 46, respectively.

FIG. 13 illustrates an example method 1300 performed by the base station 34 or other network node as contemplated herein. For example, the processing circuit 54 of a base station 34 or 38 may be configured to execute a computer program stored in the memory/storage 56, wherein the computer program comprises computer program instructions which, when executed by the processing circuit 54 configure it to carry out the method 1300 or variations of that method.

As illustrated, the method 1300 includes the step or operation of serving (Block 1302) a half-duplex TDD wireless device 40 that has a CA configuration that includes a PCell and a SCell, wherein the PCell and SCell have differing UL/DL configurations. The "serving" step in the example method comprises, e.g., providing or otherwise managing radio service to the wireless device 40 in at least one of the PCell and the SCell.

The method 1300 further includes identifying (Block 1304) a normal downlink subframe 12 in the SCell as having a first portion 20 that is overlapped by a downlink portion 14 of a special subframe 10 in the PCell, and a second portion 22 overlapped by an uplink portion 18 of the special subframe 10. Refer to FIG. 9 for an example of subframe overlap in this context.

The method 1300 further includes adapting (Block 1306) transmission to the wireless device 40 for the normal downlink subframe 12 in the SCell, so that data targeted to the wireless device 40 is not sent in the second portion 22 of the normal downlink subframe 12. In one example, adapting (Block 1306) transmission to the wireless device 40 in the normal downlink subframe 12 comprises limiting the transmission of user or control data to the first portion 20 of the normal downlink subframe 12. That is, rather than treating the entire time-wise width of the normal downlink subframe 12 as being available for downlink transmission to the wireless device 40, the network node adapts its operations so that downlink transmission to the wireless device 40 in the normal downlink subframe 12 is done within the first portion 20 of the normal downlink subframe 12. In a particular example of such limiting, limiting the transmission of user or control data to the first portion 20 of the normal downlink subframe 12 comprises at least temporarily switching the wireless device 40 from an enhanced Physical Downlink Control Channel (ePDCCH, such as shown in FIG. 8) to a Physical Downlink Control Channel (PDCCH, such as shown in FIG. 7).

In a related example, limiting the transmission of user or control data to the first portion 20 of the normal downlink subframe 12 comprises limiting the number and position of symbols transmitted on an ePDCCH or on a Physical Downlink Shared Channel (PDSCH) to correspond with the length and position of the first portion 20 of the normal downlink subframe 12.

Additionally, or alternatively, adapting (Block 1306) transmission to the wireless device 40 in the normal downlink subframe 12 comprises selecting one or more transmission parameters based on the length and/or position of the first portion 20 of the normal downlink subframe 12, rather than based on a full length of the normal downlink subframe 12. For example, selecting the one or more transmission parameters includes selecting one or more of the following: a transport block size, a modulation and coding scheme, and which Orthogonal Frequency Division Multiplex (OFDM) resource elements are used within the normal downlink subframe 12.

Additionally, or alternatively, adapting (Block 1306) the transmission to the wireless device 40 in the normal downlink subframe 12 comprises treating the normal downlink subframe 12 as if it were a special downlink subframe in the SCell, including assuming a special subframe configuration that corresponds to that used for special subframes in the PCell or in the SCell, or according to a predefined pattern or rule. That is, the network node may treat the normal downlink subframe 12 as a special subframe having the same configuration as that used for the special subframe 10 in the PCell, or having the same configuration as that of an actual special subframe in the SCell, or having a predefined configuration taken from a table or other data structure.

In at least one embodiment, adapting (Block 1306) transmission to the wireless device 40 in the normal downlink subframe 12 comprises adapting ongoing scheduling operations to avoid scheduling any Physical Downlink Shared Channel (PDSCH) transmission to the wireless device 40 in the normal downlink subframe 12. In such embodiments, PDSCH transmissions targeting the wireless device 40 are avoided in normal downlink subframes 12 in the SCell that are overlapped by special subframes 10 in the PCell.

Further, the teachings herein also contemplate adapting the transmission of Demodulation Reference Symbols (DMRS) for the wireless device 40 in the normal downlink subframe 12, to fall within the first portion 20 of the normal downlink subframe 12. The adaptation of DMRS transmission in this manner may be based on, for example, using a DMRS transmission pattern used for the special subframe 10 in the PCell, or used for actual special subframes in the SCell, or according to a predefined pattern or rule, such as may be embodied in a table or other stored data structure.

Still further, any or all of the above embodiments may be extended in view of different types of wireless devices operating in the wireless communication network 30. In an example, for carrier aggregation configurations involving PCells and SCells of different UL/DL configurations, the method 1300 may be extended to include logically treating half-duplex wireless devices 40 as belonging to a first set of wireless devices and treating full-duplex wireless devices 42 as belonging to a second set of wireless devices, and using radio blocks (RBs) from a first set of RBs to serve the first set of wireless devices 40 and RBs from a second set of RBs to serve the second set of wireless devices 42.

For further implementation details regarding the method 1300, FIG. 14 illustrates a method 1400 representing example elaborations of the method operations 1304 and 1306 introduced in FIG. 13. For example, Block 1304 from the method 1300 may comprise determining that the wireless device 40 is or will be scheduled on an overlapped normal downlink subframe 12 in a SCell (Block 1402)—here, "overlapped" denotes overlapped by a special subframe 10 in the PCell.

Continuing with the FIG. 14 example, Block 1306 from the method 1300 may comprise selecting a transport block (TB) size and/or modulation and coding scheme (MCS) to use in the SCell for the normal downlink subframe 12, as if the normal downlink subframe 12 was a special subframe (Block 1404). The method 1400 then continues with mapping channel resources and/or reference symbols for transmission in the normal downlink subframe 12 according to the special subframe configuration assumed for the normal downlink subframe 12 (Block 1406), and transmitting data and/or reference symbols to the wireless device in the normal downlink subframe 12, according to the selected mapping(s) (Block 1408).

Turning back to device-side example details, in one embodiment the wireless device 40 is configured to implement a method 1500 as shown in FIG. 15, and which includes operating (Block 1502) in a TDD mode having a carrier aggregation configuration that includes a PCell and a SCell having different Uplink/Downlink (UL/DL) configurations. The method 1500 further includes identifying (Bock 1504) a normal downlink subframe 12 in the SCell as having a first portion 20 overlapped by a downlink portion 14 of a special subframe 10 in the PCell and a second portion 22 overlapped by an uplink portion 18 of the special subframe 10; and adapting (Block 1506) reception for the normal downlink subframe 12 in the secondary cell 36.

Adapting is based on treating the normal downlink subframe 12 as an abbreviated downlink subframe having all user or control data targeted to the wireless device 40 only within the first portion 20. Treating the normal downlink subframe 12 as being abbreviated means that it is intelligently handled in the wireless device 40—i.e., it is handled or otherwise processed as having a downlink portion that is shorter than the actual time-wise width of the normal downlink subframe 12.

In an example implementation, treating the normal downlink subframe 12 as an abbreviated downlink subframe comprises limiting the reception of user data or control data to the first portion 20 of the normal downlink subframe 12. In at least one embodiment, the special subframe 10 in the PCell and the normal downlink subframe 12 in the SCell comprise subframes on primary and secondary LTE carriers. Correspondingly, limiting reception in this manner comprises, for example, at least temporarily switching from ePDCCH monitoring to PDCCH monitoring.

It will be appreciated that the processing circuit 64 of the wireless device 40 may be configured to carry out all or part of the method 1500, or variations of that method, including the identifying and adapting aspects in Blocks 1504 and 1506 of the method 1500. In one example, the processing circuit 64 is configured to carry out the method 1500 based at least in part on executing a computer program stored in the memory/storage 66, or stored in some other computer-readable medium accessible to the processing circuit 64.

FIGS. 16A-D illustrate various examples for one contemplated approach to adapting (Block 1506) reception at the wireless device 40, and it will be understood that these figures also illustrate a contemplated corresponding approach for adapting (Block 1306) transmission at the network node, e.g., at a base station 34 or 38. The figures apply to transmission/reception adaptations taken with respect to a half-duplex TDD wireless device 40 having a CA configuration involving a PCell and SCell that have differing UL/DL configurations, and particularly with respect to adaptations taken for a normal downlink subframe 12 in the SCell that is overlapped by a special subframe in the PCell.

In FIG. 16A, one sees that PDSCH or ePDCCH transmission for the normal downlink subframe 12 is stopped after "X" symbols in the SCell, where the table values specified are for normal CPs in use in the PCell and in the SCell. Such stoppage can be understood on the network side as a transmission adaptation. Correspondingly, the stoppage implies reception adaptation on the receiver side, wherein the wireless device 40 adapts its reception with respect to the normal downlink subframe 12, based on understanding that user or control data targeted to the wireless device 40 is sent within the first X symbols of the normal downlink subframe 12.

For ePDCCH transmission, the calculation of the number of available REs in the subframe takes into account the stop value X. Hence, OFDM symbols beyond the stop value are counted as non-available REs. This adjustment affects the set of available aggregation levels the wireless device 40 monitors, because the number of available REs is compared against a threshold parameter, denoted as Xthresh, to determine the set of aggregation levels the wireless devices monitors. The value of Xthresh depends on the stop value X.

Similarly, FIGS. 16B, 16C and 16D provide additional example stop values X. The different tables in these diagrams represent various combinations of normal and extended cyclic prefix usage between the primary and secondary cells.

FIG. 17 illustrates another example of adapting transmission for the normal downlink subframe 12, and can further be understood as implying corresponding, complementary adaptations of reception processing at the wireless device 40 for an overlapped normal downlink subframe 12. In particular, one sees that the DMRS and ePDCCH to RE mapping used for the normal downlink subframe 12 is based on the special subframe configuration used for the special subframe 10. The mapping proposed in FIG. 17 assumes that the PCell and the SCell are using the same cyclic prefix configuration.

FIG. 18 illustrates an alternative mapping for DMRS and ePDCCH RE for the normal downlink subframe 12. The illustrated mapping assumes that the SCell uses a normal CP while the PCell uses an extended CP.

FIGS. 16A-16D and FIGS. 17 and 18 illustrate the applicability of the teachings herein to cases where the PCell and the SCell are using the same CP configuration, or are using different CP configurations. One embodiment herein contemplates that the DMRS transmission pattern is adapted for the SCell for the normal downlink subframe 12, to use (1) the configuration used for the special subframe 10 in the PCell, (2) the configuration used for an actual special subframe in the SCell, or (3) a predefined configuration determined according to a rule or table.

In one such embodiment, the network node transmits the same DMRS pattern on the normal downlink subframe 12 in the SCell as would be utilized in the PCell for PDSCH. The DMRS positions in the normal downlink subframe 12 in the SCell are determined based on the special subframe configuration of the PCell. It is further given by this embodiment that the wireless device 40 assumes that the network node, e.g., base station 34 or 38, will use such a DMRS pattern for PDSCH transmission targeted to the wireless device 40.

In one alternative, the network node uses the special subframe configuration of the SCell, and the wireless device 40 assumes such usage.

In yet another alternative, the network node uses a specified DMRS pattern, and the wireless device 40 assumes such usage. For example, the network node and the wireless device 40 select a special subframe configuration to be used as the assumed configuration of the normal downlink subframe 12 based on a rule specified in the relevant physical layer specifications against which they operate—e.g., the TS 36.213 specification promulgated by the Third Generation Partnership Project (3GPP) for LTE.

In one such embodiment, a special subframe configuration is selected with the largest possible DwPTS without exceeding the time Tgap between the end of the DwPTS and the start of the UpPTS of the primary cell 32 or 36. The time Tgap would be fixed as a specification value, and could for example be Tgap=1456 Ts, where "Ts" is a base unit of time. The DMRS positions are then determined for the normal downlink subframe 12 for purposes of transmission and reception based on the selected special subframe configuration. Of course, the normal downlink subframe 12 does not include an actual UpPTS part, but is logically treated as such and the relevant transmission and reception processes are adapted as if the actual downlink portion of the normal downlink subframe 12 was so abbreviated.

It is further recognized herein that the immediately forgoing examples of DMRS mapping also apply in the case that the wireless device 40 is configured to receive ePDCCH on the SCell.

FIG. 19 provides example configuration or mapping rules for DMRS positions in the normal downlink subframe 12 in the SCell when the PCell uses a different CP configuration than the SCell. According to row 1 in the illustrated table, if the PCell is configured with normal cyclic prefix and the special subframe configuration of the PCell is 1, 2, 3, 4, 6, 7 or 8, then DMRS positions for the normal downlink subframe 12 in the SCell are given by special subframe configuration 1, 2, 3, 5 or 6 where the SCell uses the extended cyclic prefix. According to the second row, if the PCell is configured with extended cyclic prefix and the special subframe configuration is 3, then DMRS positions for special subframe configuration 3, 4 or 8 are used for the normal downlink subframe 12 in the case that the SCell is configured with normal cyclic prefix. According to the third row of the table shown in FIG. 19, if the PCell is configured with extended cyclic prefix and the special subframe configuration is 1, 2, 5 or 6, then DMRS positions for the normal downlink subframe 12 in the SCell are given by special subframe configuration 1, 2, 6 or 7, where the SCell uses a normal cyclic prefix.

In a further aspect of the teachings herein, the base station 34 can configure half-duplex TDD wireless devices 40 to share the same set of ePDCCH configurations. For instance, such devices share the same ePDCCH set and the same higher-layer configured DMRS scrambling codes.

Further, the base station 34 may be configured to schedule the wireless devices 40 to overlapping Physical Resource Blocks (PRBs). Hence, such devices can be scheduled on the same PRB pairs in a Multi-User Multiple-Input-Multiple-Output (MU-MIMO) PDSCH transmission in an overlapped normal downlink subframe 12 in the SCell. The base station 34 may be configured to use another set of PRBs to support ePDCCH transmissions to full-duplex TDD wireless devices 42.

Thus, in one or more embodiments, the base station 34 is configured to logically divide RBs into two sets with respect to scheduling in a SCell for a given overlapped normal downlink subframe 12. A first set "A" of RBs is used for full-duplex TDD wireless devices 42, while a second set "B" of RBs is used for half-duplex TDD wireless devices 40. The base station 34 may determine device type (e.g., half-duplex/full-duplex) for each of a plurality of served wireless devices. The base station 34 may then identify a set of RBs (e.g., set A or set B) to use for transmissions to a particular device based on the type of that device. The base station 34 may then select one or more RBs from the identified set and transmit information to the targeted device using the selected RBs.

In another example of transmit (and corresponding receive) adaptations, consider that in LTE the transport block size is determined by reading from a two-dimensional transport block size Table 7.1.7.2.1-1 specified in 3GPP TS 36.213, using two parameters $I_{TBS}$ and $N_{PRB}$.$_{TBS}$. The value $I_{TBS}$ is given by the downlink control channel (either PDCCH or ePDCCH). From the resource allocation contained in the control channel, a given conventional terminal first calculates $N'_{PRB}$ as the total number of allocated PRBs based on the procedure defined in Section 7.1.6 of TS 36.213. For a subframe that is not a TDD special subframe, then the terminal sets $N_{PRB}=N'_{PRB}$.

However, according to the teachings herein, a wireless device 40 or other such terminal uses a different approach for setting the value of $N_{PRB}$, for a normal downlink subframe 12 in an SCell that is overlapped by a special subframe 10 in the PCell. In particular, the wireless device 40 sets the value of $N_{PRB}$ as $N_{PRB}=\{[N_{PRB}\cdot 0.75], 1\}$, for the overlapped normal downlink subframe 12. With this adaptation, the transport block size for the normal downlink subframe 12 will be smaller than that used for a normal downlink subframe in the SCell that is not overlapped by a special subframe 10 in the PCell.

Additionally, in one or more embodiments the base station 34 selects an MCS for the overlapped normal downlink subframe 12 in the SCell that has a lower modulation and coding rate than would be selected by the base station 34 if the normal downlink subframe 12 was not overlapped by a special subframe 10 in the PCell.

Also, as noted, the base station 34 may transmit PDSCH or ePDCCH on the SCell in the normal downlink subframe 12 for a period of time that is shortened in comparison to that which would be used in the case that the normal downlink subframe 12 was not overlapped by a special subframe 10 in the PCell. In a non-limiting example, rather than using the 1 ms subframe time for the normal downlink subframe 12, the base station 34 limits its transmissions for the targeted wireless device 40 to be within the first X symbols in the normal downlink subframe 12.

Also as noted, limiting transmissions in this manner means, for ePDCCH transmissions, that the base station 34 calculates the number of available REs in the subframe in consideration of the stop value X. Hence, OFDM symbols beyond the stop value X are counted as non-available REs. This aspect of adaptation reduces the set of available aggregation levels monitored by the wireless device 40 for the normal downlink subframe 12 at issue, because the available REs are compared against a threshold parameter, Xthresh, the value of which is determined by the value of the stop value X. The wireless device 40 in this embodiment thus limits the number of aggregation levels it monitors for the ePDCCH in the SCell, for the case of normal downlink subframes 12 that are overlapped by special subframes in the PCell.

In a further example of adaptation, the base station 34 may be configured not to schedule the wireless device 40 on PDSCH in the SCell, for the normal downlink subframe 12 in the SCell. Additionally, to the extent that the wireless device 40 is configured to receive ePDCCH in the SCell, the base station 34 (and the wireless device 40) at least temporarily switch from ePDCCH to PDCCH in the SCell, at least for the normal downlink subframe 12.

In yet another example of the contemplated transmit- and/or receive-side adaptations, and as noted earlier, the normal downlink subframe 12 may be treated in some sense as being a special subframe, even though it is not an actual special subframe. The base station 34 and the wireless device 40 in such embodiments adapt their respective transmit and receive operations for the normal downlink subframe 12 in the SCell as if the normal downlink subframe 12 was a special subframe having the same configuration as that used for the PCell, or having the same configuration as that used for actual special subframes in the SCell, or having one of the available, predefined special subframe configurations, e.g., selected according to a known rule.

In such embodiments, the base station 34 transmits for the wireless device 40 in the normal downlink subframe 12 in the SCell, according to the DwPTS applicable to the special subframe configuration assumed for the normal downlink subframe 12. Hence, the DMRS pattern for PDSCH and ePDCCH transmissions, and the calculation of the number of available REs, used for ePDCCH aggregation level determination depends on this imaginary special subframe configuration. Furthermore, the selection of the parameter L, the number of enhanced REGs (eREGs) per enhanced CCE (eCCE) is also determined in the same way as in a special subframe with the same configuration as this imaginary subframe configuration. Of course, the normal downlink subframe 12 is only imagined or treated as being a special subframe for purposes of DL-related transmit and receive operations, and it has no actual UpPTS available for UL scheduling.

The selection of the special subframe configuration to assume for the normal downlink subframe 12 may be any one of the following alternatives (and different alternatives may be selected at different times): the same special subframe configuration as is used on the PCell in the same subframe; the same special subframe configuration as is configured on the same SCell; the special subframe configuration having the largest possible DwPTS, as selected from among the predefined special subframe configurations; or the special subframe configuration with the largest possible DwPTS, with the further restriction that the time between the end of the DwPTS and the start of the UpPTS on any other aggregated cell, or on the PCell in particular, must be larger than some threshold, referred to as Tgap. The time Tgap shall be fixed in the relevant specification, and could for example be Tgap=1456 Ts, where "Ts" is a base unit of time. Note that the base station 34 would signal the DMRS patterns and configurations for PDSCH and ePD-CCH reception.

With respect to ePDCCH transmission and an assumed special subframe configuration for the normal downlink subframe 12, the ePDCCH configuration would follow the rules applicable to the assumed special subframe configuration. Thus, the value L representing the number of eREGs per eCCE, which can be 4 or 8 depending on the subframe type or CP length, is selected based on the imaginary subframe configuration and the cyclic prefix being used in the SCell. Furthermore, the selection of available aggregation levels, which depends on the number of available REs in the subframe and on the special subframe configuration, should assume the same imaginary subframe configuration when computing these parameters.

In a further embodiment, when computing the number of available REs for the normal downlink subframe 12 in the SCell, the base station 34 shall assume the imaginary special subframe configuration (and DwPTS length), but use the overhead of other signals of the SCell. For instance, the legacy control region length (which defines the ePDCCH start symbol) and the Channel State Information Reference Signal (CSI-RS) configurations as they are defined for the particular SCell should be used.

Correspondingly, the targeted wireless device 40 will adapt its receive processing for the ePDCCH in the SCell, for the normal downlink subframe 12, based on assuming that the ePDCCH uses the available REs in the subframe as calculated according to the specification outlined above, where DwPTS length is taken from the corresponding imaginary special subframe, but where the EPDCCH start symbol and the presence of CRS and CSI-RS are taken from the configuration of the SCell.

In one example of device-side adaptation, the adapting step 1506 of the method 1500 comprises the wireless device 40 assuming that one or more transmission parameters for the normal downlink subframe 12 in the secondary cell 36 are set based on the length and/or position of the first portion 20 of the normal downlink subframe 12, rather than based on a full length of the normal downlink subframe 12. The one or more transmission parameters include one or more of the following: a transport block size, a modulation and coding scheme, and which OFDM resource elements are used within the normal downlink subframe 12.

In another example, the adapting step 1506 comprises the wireless device 40 treating the normal downlink subframe 12 as if it were a special downlink subframe in the secondary cell 36, including assuming a special subframe configuration that corresponds to that used for special subframes in the primary or secondary cell 32, 36, or according to a predefined pattern or rule.

In another example, the adapting step 1506 comprises the wireless device 40 assuming that the transmission of any DMRS for the wireless device 40 in the normal downlink subframe 12 fall within the first portion 20 of the normal downlink subframe 12, according to a DMRS transmission pattern used for the special subframe in the primary cell 32 or used for special subframes in the secondary cell 36, or according to a predefined pattern or rule.

Of course, the adapting step 1506 can comprise multiple adaptations, e.g., regarding the assumption of MCS, resource allocations or positions, DMRS patterns, etc. Further, it will be understood that the adaptive behavior may be implemented in the wireless device 40 via proper configuration of its processing circuit 64, e.g., via programmatic configuration, so that the processing circuit 64 in the wireless device 40 makes dynamic reception adaptations as described.

The above example embodiments provide a number of advantages on the network side and on the device side. Among those advantages, the teachings herein enable transmissions involving DMRS based demodulation to be targeted toward a half-duplex TDD wireless device 40 in a normal downlink subframe 12 in a SCell, where the normal downlink subframe 12 is overlapped by a special subframe in the PCell. Such transmissions are enabled based on the advantageous transmit and receive adaptations taught herein, including the remapping of DMRS to account for the effective abbreviation of the normal downlink subframe 12.

Similar improvements apply to MCS selection for the normal downlink subframe 12, and scheduling is improved substantially in one or more embodiments, e.g., by adapting ongoing scheduling operations so that the wireless device 40 is not scheduled for PDSCH in the SCell for such normal downlink subframes 12.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a half-duplex capable wireless device operating in a wireless communication network, said method comprising:
    operating in a Time Division Duplex (TDD) mode having a carrier aggregation configuration that includes a primary cell and a secondary cell having different Uplink/Downlink (UL/DL) configurations;
    identifying a normal downlink subframe in the secondary cell as having a first portion overlapped by a downlink portion of a special subframe in the primary cell and a second portion overlapped by an uplink portion of the special subframe; and
    adapting reception for the normal downlink subframe in the secondary cell, based on treating the normal downlink subframe as an abbreviated downlink subframe having all user or control data targeted to the wireless device only within the first portion, including limiting the reception of user or control data to the first portion of the normal downlink subframe, and assuming that transmission parameters for the transmission of the user or control data were set based on a length and position of the first portion of the normal downlink subframe, rather than based on a full length of the normal downlink subframe.

2. The method of claim 1, wherein the special subframe and the normal downlink subframe comprise subframes on primary and secondary LTE carriers in the primary and secondary cells, respectively.

3. The method of claim 1, wherein limiting the reception of user data or control data to the first portion of the normal downlink subframe comprises at least temporarily switching from enhanced Physical Downlink Control Channel (ePDCCH) monitoring to Physical Downlink Control Channel (PDCCH) monitoring.

4. The method of claim 1, wherein the one or more transmission parameters include one or more of the following: a transport block size, a modulation and coding scheme, and which Orthogonal Frequency Division Multiplex (OFDM) resource elements are used within the normal downlink subframe.

5. The method of claim 1, wherein adapting the reception for the normal downlink subframe in the secondary cell further comprises treating the normal downlink subframe as if it were a special downlink subframe in the secondary cell, including assuming a special subframe configuration that corresponds to that used for special subframes in the primary or secondary cell, or according to a predefined pattern or rule.

6. The method of claim 1, wherein adapting the reception for the normal downlink subframe in the secondary cell further comprises assuming that the transmission of any Demodulation Reference Symbols (DMRS) for the wireless device in the normal downlink subframe fall within the first portion of the normal downlink subframe, according to a DMRS transmission pattern used for the special subframe in the primary cell or used for special subframes in the secondary cell, or according to a predefined pattern or rule.

7. A half-duplex capable wireless device configured for operation in a wireless communication network, said wireless device comprising:
   a communication interface configured to receive signals from the wireless communication network and to transmit signals to the wireless communication network; and
   a processing circuit that is operatively associated with the communication interface and, for the case where the wireless device operates in a Time Division Duplex (TDD) mode having a carrier aggregation configuration that includes a primary cell and a secondary cell of the wireless communication network having different Uplink/Downlink (UL/DL) configurations, is configured to:
      identify a normal downlink subframe in the secondary cell as having a first portion overlapped by a downlink portion of a special subframe in the primary cell and a second portion overlapped by an uplink portion of the special subframe; and
      adapt reception for the normal downlink subframe in the secondary cell, based on treating the normal downlink subframe as an abbreviated downlink subframe having all user or control data targeted to the wireless device only within the first portion, including limiting the reception of user or control data to the first portion of the normal downlink subframe, and assuming that transmission parameters for the transmission of the user or control data were set based on a length and position of the first portion of the normal downlink subframe, rather than based on a full length of the normal downlink subframe.

8. The wireless device of claim 7, wherein the processing circuit is configured to adapt reception for the normal downlink subframe based on at least temporarily switching from enhanced Physical Downlink Control Channel (ePDCCH) monitoring to Physical Downlink Control Channel (PDCCH) monitoring.

9. The wireless device of claim 7, wherein the one or more transmission parameters include one or more of the following: a transport block size, a modulation and coding scheme, and which Orthogonal Frequency Division Multiplex (OFDM) resource elements are used within the normal downlink subframe.

10. The wireless device of claim 7, wherein the processing circuit is configured to adapt reception for the normal downlink subframe in the secondary cell further based on treating the normal downlink subframe as if it were a special downlink subframe in the secondary cell, including assuming a special subframe configuration that corresponds to that used for special subframes in the primary or secondary cell, or according to a predefined pattern or rule.

11. The wireless device of claim 7, wherein the processing circuit is configured to adapt reception for the normal downlink subframe in the secondary cell further based on assuming that the transmission of any Demodulation Reference Symbols (DMRS) for the wireless device in the normal downlink subframe fall within the first portion of the normal downlink subframe, according to a DMRS transmission pattern used for the special subframe in the primary cell or used for special subframes in the secondary cell, or according to a predefined pattern or rule.

* * * * *